United States Patent Office 3,741,921
Patented June 26, 1973

3,741,921
FLAME RETARDANT POLYURETHANE FOAMS BASED ON POLYETHERS FROM 4,4,4 - TRICHLORO-1,2-EPOXYBUTANE
Milton Lapkin, Barrington, R.I., assignor to Olin Corporation
No Drawing. Continuation-in-part of application Ser. No. 62,784, June 10, 1970, which is a division of application Ser. No. 786,772, Dec. 24, 1968, which in turn is a continuation-in-part of application Ser. No. 563,714, July 7, 1966, all now abandoned. This application May 1, 1972, Ser. No. 249,119
Int. Cl. C08g 22/46, 22/16
U.S. Cl. 260—2.5 AS             10 Claims

ABSTRACT OF THE DISCLOSURE

Flame retardant polyurethane foams and a process for preparing them are disclosed. The process comprises reacting, in the presence of a catalyst, and a foaming agent, an organic isocyanate with a chlorinated polyhydroxy polyether prepared by reacting a dextrose- or sucrose-based material with 4,4,4-trichloro-1,2-epoxybutane.

This application is a continuation-in-part of co-pending application Ser. No. 62,784, now abandoned which was filed June 10, 1970 as a division of now abandoned application Ser. No. 786,772, filed Dec. 24, 1968. The latter application, Ser. No. 786,772, in turn was a continuation-in-part of application Ser. No. 563,714, filed July 7, 1966 and now abandoned.

This invention relates to flame retardant polyurethane foam and to the use of a select group of chlorinated polyhydroxy polyethers in preparing polyurethane foam.

The polyurethanes are an extremely useful group of plastics, having applications as rigid and flexible foams, as adhesives, coatings, elastomers, potting resins, in textiles, etc. Polyurethane foams have found wide and varied uses in industry. For example, rigid foams are used as insulators and the flexible and semi-rigid foams in cushioning and packaging applications.

In view of the desirability of providing flame-retardant polyurethane foams, numerous attempts have been made to impart flame retardant properties to these materials. Thus, U.S. Pats. 3,244,754 and 3,269,961 disclose the use of an adduct of 4,4,4-trichloro-1,2-epoxybutane and selected polyhydric alcohols in the preparation of flame-retardant polyurethane foams. While the aforementioned polyethers do impart a degree of flame retardance to polyurethanes prepared therefrom, the problem of flammability in foams has not been eliminated by the use of these adducts.

U.S. Pats. 3,324,108 and 3,300,474 disclose the reaction of epichlorohydrin with dextrose and sucrose, respectively. However, the resulting dextrose- and sucrose-based polyethers have been found to be unsuitable for the preparation of polyurethane foams which would be useful in applications requiring a high degree of flame retardance.

Finally U.S. Pat. 3,402,169 discloses polyhalogenated polyethers that are said to be useful in the preparation of flame retardant polyurethane foam, which polyethers are prepared by reacting a polyhalogenated alkylene oxide with any one of a variety of polyhydric initiators having two to eight hydroxy groups.

Now it has been found in accordance with this invention that highly flame retardant polyurethane foams can be prepared by reacting, in the presence of a catalyst and a foaming agent, an organic polyisocyanate with a chlorinated polyhydroxy polyether which in turn is prepared from 4,4,4-trichloro-1,2-epoxybutane and a dextrose- or sucrose-based material.

By the term "dextrose- or sucrose-based material" as used in the specification and claims herein is meant one of the following materials: a mixture of dextrose and water; and oxyalkylated mixture of dextrose and water; a mixture of dextrose and a polyhydric alcohol; an oxyalkylated mixture of dextrose and a polyhydric alcohol; a mixture of dextrose, water and a polyhydric alcohol; an oxyalkylated mixture of dextrose, water and a polyhydric alcohol; a mixture of sucrose and water; an oxylkylated mixture sucrose and water; a mixture of sucrose and a polyhydric alcohol; an oxyalkylated mixture of sucrose and a polyhydric alcohol; a mixture of sucrose, water, and a polyhydric alcohol; and an oxyalkylated mixture of sucrose, water, and a polyhydric alcohol.

Any type of sucrose or dextrose, otherwise referred to as glucose, can be employed in the preparation of the sucrose- or dextrose-based material. Thus, for example, anhydrous dextrose or a hydrated dextrose, such as d-glucose monohydrate, may be suitably used.

The dextrose-based material comprising a mixture of dextrose, water, and/or a polyhydric alcohol is provided by mixing dextrose with water and/or a polyhydric alcohol, and, if necessary, heating the resulting mixture, i.e., to between about 25° and 150° C., in order to dissolve the dextrose.

Any polyhydric alcohol containing at least two hydroxyl groups may be employed in the preparation of the above-described dextrose-based material. Illustrative polyhydric alcohols include, but are not limited to, glycerol, ethylene glycol, propylene glycol, sorbitol, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like.

Although any suitable proportion of water and/or a polyhydric alcohol, may be employed, it is preferred to employ from about 0.5 to about 5 moles each of water and/or a polyhydric alcohol per each mole of dextrose.

An oxyalkylated mixture of dextrose, water and/or a polyhydric alcohol can be prepared by reacting the dextrose-water and/or alcohol mixture with an epoxide, preferably a halogen-free epoxide, prior to reaction with 4,4,4-trichloro-1,2-epoxybutane. Where a halogen-free epoxide is employed, any compound or mixture of compounds containing a 1,2-epoxide can be conveniently employed. Typical of such compounds are the alkylene oxides, the aryl-alkyl oxides, the cycloalkylene oxides, and the like. Specific reactants include, but are not limited to, ethylene oxide, propylene oxide, butylene oxide, glycidol, isobutylene oxide, n-hexyl oxide, cyclobutylene oxide, cyclohexylene oxide, mixtures thereof and the like. The preferred epoxides are the lower alkylene oxides, that is, those containing between 2 and about 4 carbon atoms, such as ethylene oxide and propylene oxide.

The aforementioned oxyalkylation reaction is carried out at a temperature between about 30° and about 200° C. in the presence of a reaction catalyst which may be an acid or an alkaline catalyst. Acid catalysts include for example inorganic, organic, and Lewis acids. Illustrative of these are phosphoric acid, hydrofluoric acid, acetic acid, succinic acid, boron trifluoride, boron trichloride, aluminum chloride, ferric chloride, acidic clays such as Tonsil clay and the like. Illustrative alkaline catalysts include sodium hydroxide, sodium bicarbonate, sodium methylate, and the like.

Any suitable proportion of epoxide may be employed in preparing the dextrose-based material, such as about 0.5–2.0 moles of epoxide per each mole of dextrose. It is generally preferred that the mole ratio of total epoxide, i.e., 4,4,4-trichloro-1,2-epoxybutane together with any halogen-free epoxide, to dextrose be greater than 3:1 in the final chlorinated polyether product.

The sucrose-based materials employed in the preparation of the chlorinated polyhydroxy polyethers are prepared in the same manner as described above for the preparation of the dextrose-based materials. Generally the dextrose-based materials are preferred for use according to the invention.

Before utilizing one of the aforementioned dextrose- or sucrose-based materials in preparing the chlorinated polyhydroxy polyethers, it may optionally be treated by any conventional means, such as stripping, to reduce or remove the content of volatile materials, e.g., water, that may be present therein. This step is mandated where it is desired, in accordance with the preferred embodiments of the invention, to prepare the chlorinated polyhydroxy polyether in an anhydrous reaction system.

The chlorinated polyhydroxy polyethers are prepared by reacting one of the aforementioned dextrose-based or sucrose-based materials with 4,4,4 - trichloro-1,2-epoxybutane at a temperature between about 30° and about 200° C., and preferably between about 70° and about 130° C. The reaction is carried out in the presence of an acid catalyst; any of the acid catalysts mentioned previously as suitable for use in the preparation of the dextrose- or sucrose-based materials can be suitably used in this oxyalkylation reaction.

The 4,4,4-trichloro-1,2-epoxybutane can be employed in purified form or, according to the preferred embodiments of the invention, as a component of a crude reaction mixture obtained by the dehydrohalogenation of 2,4,4,4-tetrachlorobutanol. It can also be used in the form of a blend thereof with a halogen-free epoxide. Any of the halogen-free epoxides listed previously as suitable for use in the preparation of the sucrose-based and dextrose-based materials can be employed as a component of such a blend. However, it is critical to the practice of this invention that, regardless of the number or type of components employed in the preparation of the chlorinated polyhydroxy polyethers, the 4,4,4-trichloro - 1,2 - epoxybutane comprises at least 15%, and preferably from about 30 to about 85%, by weight of the total reactants employed in preparing the chlorinated polyhydroxy polyether. The chlorinated polyhydroxy polyether of this invention can also be further reacted with one or more of the aforementioned halogen-free epoxides, again with the proviso that the 4,4,4-trichloro-epoxybutane amounts to at least 15% by weight of the total polyether reactants. While any of the aforementioned chlorinated polyhydroxy polyethers can be provided according to this invention, preferred embodiments include those polyethers having a chlorine content between about 20 and about 55%, and more preferably about 25–50%, by weight of the polyether.

As used in practicing the process of the invention, the chlorinated polyhydroxy polyether can have a hydroxyl number from about 30 to about 800, depending on the ratio of total epoxide used in preparing it to the sucrose- or dextrose-based material. And as is well known in the art, depending on the hydroxyl number of the polyether which is used in making polyurethane foam, such foam can be rigid, semi-rigid, or flexible. Generally flexible foams obtain using a polyether having a hydroxyl number of about 30–60; semi-rigid foams obtain when a polyether having a hydroxyl number of about 75–175; and to make rigid foam, a polyether having a hydroxyl number of about 175–800 is used. According to the preferred embodiments of the invention, rigid polyurethane foams are prepared using a chlorinated polyhydroxy polyether having a hydroxyl number of about 175–800 and more preferably about 250–550.

The polyurethane foams of this invention, be they flexible, semi-rigid, or rigid, are prepared by reacting the previously described chlorinated polyhydroxy polyether with an organic polyisocyanate in the presence of a reaction catalyst and a blowing agent. If desired the chlorinated polyhydroxy polyether may be stripped of any volatile materials, e.g., water, that may be present therein before it is used in making polyurethane foam.

Any of the widely known organic polyisocyanates may be employed in the preparation of the polyurethane foams of the invention. This includes diisocyanates, triisocyanates, and polyisocyanates. The organic diisocyanates are preferred due to commercial availability, especially mixture of isomers of toluene diisocyanate which are readily available commercially. The most common isocyanate available is toluene diisocyanate, which is readily available commercially as a mixture of about 80 percent by weight of the 2,4-isomer and about 20 percent of the 2,6-isomer. Other typical exemplificative isocyanates include, but are not limited to, the following: methylene-bis-(4-phenyl isocyanate); 3,3'-bitoluene-4,4'-diisocyanate; 3,3'-dimethoxy-4,4'-biphenylene diisocyanate; naphthalene-1,5-diisocyanate; hexamethylene diisocyanate; 1,4-phenylene diisocyanate; polyphenylene polymethylene isocyanate; etc.

Any suitable proportion of isocyanate may be employed in preparing the polyurethane foams of the invention. Usually such a proportion is used to provide at least 0.7, and preferably about 0.9–1.1, NCO groups per hydroxyl group present in the reaction system.

The foaming agent employed may be any of those known to be useful for this purpose, such as water, the halogenated hydrocarbons, and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the chlorinated polyhydroxy polyether of the present invention, and water can be employed in an amount of from 0.1 to 10 parts by weight per 100 parts by weight of the chlorinated polyhydroxy polyether of the present invention.

Any of the catalysts known to be useful in the preparation of polyurethane foams may be employed, including tertiary amines, metallic salts, and mixtures thereof. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight based on the polyether of the present invention.

It is preferred in the preparation of the polyurethane foams of the present invention to employ minor amounts of a surfactant in order to improve the cell structure of the polyurethane foam. Typical of such surfactants are the silicone oils and the siloxane-oxyalkylene block copolymers. Generally, up to 2 parts by weight of the surfactant is employed per 100 parts of polyether.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and antioxidants may be added.

The polyurethane foams of this invention are characterized by remarkable flame-retardant properties. Thus, these polyurethane foams pass the SPI Proposed Tentative Test Method For Flame Penetration Test, a severe test requiring direct contact of the polyurethane foam with a propane flame having a temperature between 1910° and 1960° F. Furthermore, these polyurethane foams have low fire hazard classification when tested in accordance with the Underwriter's Laboratories Test UL723, 3rd edition. The flame-retardant properties of these foams make them particularly valuable for use in building applications where flame retardance is a critical factor.

In addition to flame retardance, the polyurethane foams of this invention have other highly desirable properties. For example, their excellent moisture vapor transmission and humid aging properties enhance their attractiveness in a variety of commercial applications.

The following examples will serve to illustrate the practice of this invention; all parts and percentages are by weight unless otherwise specified. Where crude 4,4,4-trichloro-1,2-epoxybutane is indicated in the examples, this generally refers to a mixture comprised of approximately 70–75 percent by weight 4,4,4-trichloro-1,2-epoxybutane, 3 percent by weight tetrachlorobutanol, 2 percent by weight dichloroepoxybutane, with the balance comprised of unidentified, high boiling by-products of the dehydrohalogenation of tetrachlorobutanol.

EXAMPLE 1

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50°–70° C. The volatiles, mainly water, were stripped at 75°–80° C. and 3 mm. of mercury pressure. Boron trifluoride etherate (2.3 parts) and 4,4,4-trichloro-1,2-epoxybutane (1147 parts) were added to the reaction mixture while maintaining a temperature of 80° C. The resulting polyol had a hydroxyl number of 279 mg. KOH/gm. and a viscosity of 2,000,000 cps. at 29° C.

To 100 parts of the above polyol there were added 1.5 parts of N,N,N',N'-tetramethylbutanediamine, 26 parts of trichlorofluoromethane, and a conventional silicone surfactant, Dow Corning DC–193, which is a siloxane-oxyalkylene block copolymer.

The mixture was stirred until homogeneous. Then 75 parts of polyphenylene polytetramethylene isocyanate were added. After stirring, the mixture was poured into a rectangular box. Creaming of the mixture was observed after 18 seconds. After 121 seconds, the foam began to rise, and a tack-free foam was obtained after 111 seconds. The foam had excellent physical properties as set forth in Table II below.

EXAMPLE 2

Glycerol (92 parts) was charged to a reactor containing 342 parts of sucrose. Heat was applied and the temperature of the mixture increased to 150° C. After the mixture became homogeneous, boron trifluoride etherate (2.3 parts) was added. Then a blend of propylene oxide (392 parts) and 4,4,4-trichloro-1,2-epoxybutane (1185 parts) was added, while maintaining a temperature of 80°–90° C. The volatiles were stripped at 90° C. and less than 10 mm. of mercury pressure. The following properties of the resulting polyol were determined:

Hydroxyl No.: 344 mg. KOH/gm.
Acid No.: 1.5 mg. KOH/gm.
Viscosity: 73,000 cps. at 25° C.

A foam was prepared from this polyol with the reactants and in the proportions listed in Table I below. Its properties are listed in Table II below.

EXAMPLE 3

Boron trifluoride etherate (1.1 parts) was added to 822 parts of the polyol prepared in Example 2, followed by the addition of 4,4,4-trichloro-1,2-epoxybutane (152 parts), while maintaining a temperature of 70°–90° C. The volatiles were stripped at 80°–90° C. and less than 10 mm. of mercury pressure. The following properties of the resulting polyol were determined:

Hydroxyl No.: 289 mg. KOH/gm.
Acid No.: 1.8 mg. KOH/gm.
Viscosity: 179,625 cps. at 25° C.

The composition of the foam prepared from this polyol is set forth in Table I. Its properties are listed in Table II.

EXAMPLES 4–7

Following the procedure of Example 1, ethylene oxide (110 parts) was reacted with sucrose (342 parts) in a water (100 parts) solution containing boron trifluoride etherate (2.3 parts). The volatiles were stripped at 75°–80° C. and 8 mm. of mercury pressure. Additional boron trifluoride etherate (2.3 parts) was charged to the reactor. The resulting composition was divided into Portions A, B, C and D which were employed as starting materials in Examples 4–7, respectively.

In example 4, Portion A (550 parts) was reacted with a blend of 494 parts propylene oxide and 494 parts 4,4,4-trichloro-1,2-epoxybutane, while maintaining a reaction mixture temperature of 70°–90° C. The volatiles were stripped at 80–90° C. and less than 10 mm. of mercury pressure. The resulting polyol had a hydroxyl number of 374 mg. KOH/gm. and a viscosity of 46,000 cps. at 25° C.

A foam was prepared employing this polyol with the reactants and in the proportions listed in Table I. The properties of the foam are set forth in Table II.

In Example 5, 325 parts of propylene oxide were added to Portion B (370 parts) while maintaining a temperature of 70°–90° C. After the addition was completed, 327 parts of 4,4,4-trichloro-1,2-epoxybutane was added. The volatiles were stripped at 80°–90° C. and less than 10 mm. of mercury pressure. The resulting polyol had a hydroxyl number of 374 mg. KOH/gm. and a viscosity of 71,600 cps. at 25° C.

The data for the foam prepared from this polyol is set forth in Tables I and II below.

In Example 6, Portion C (370 parts) was reacted with 325 parts of 4,4,4-trichloro-1,2-epoxybutane, while maintaining a temperature of 70°–90° C. After the addition was completed, 324 parts of propylene oxide were added. The volatiles were stripped at 80°–90° C. and less than 10 mm. of mercury pressure. The resulting polyol had a hydroxyl number of 389 mg. KOH/gm. and a viscosity of 96,000 cps. at 25° C.

The data for the foam prepared from this polyol is set forth in Tables I and II below.

In Example 7, 183 parts of ethylene oxide were added to Portion D (406 parts) while maintaining a temperature of 70°–90° C. After the addition was completed, a blend of 179 parts propylene oxide and 359 parts of 4,4,4-trichloro-1,2-epoxybutane oxide was added. The volatiles were stripped at 80°–90° C. and less than 10 mm. of mercury pressure. The resulting polyol had a hydroxyl number of 380 mg. KOH/gm. and a viscosity of 39,000 cps. at 25° C.

The data for the foam prepared from this polyol is listed in Tables I and II.

EXAMPLE 8

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50°–70° C. The volatiles, mainly water, were stripped at 75°–80° C. and 3 mm. of mercury pressure. Boron trifluoride etherate (2.3 parts) and a blend of 50 parts propylene oxide, 50 parts 4,4,4-trichloro-1,2-epoxybutane were added to the reaction mixture while maintaining a temperature between 70°–80° C. After the addition was completed, the volatiles were stripped at 90° C. under one mm. of mercury pressure. The polyol had the following properties:

Hydroxyl No.: 320 mg. KOH/gm.
Acid No.: 1.5 mg. KOH/gm.
Viscosity: 35,400 cps. at 25° C.
pH: 3.4

The data for the preparation of a foam using this polyol is set forth in Table I below; the properties of the foam are listed in Table II.

TABLE I.—FOAMING DATA

| Example No. | Ingredients used in foam, in parts by weight | | | | | Cream time, sec. | Rise time, sec. | Tack time, sec. |
|---|---|---|---|---|---|---|---|---|
| | Polyether | Silicone surfactant as used in Example 1 | N,N,N',N'-tetramethyl-butanediamine | Trichloro-fluoro methane | Polyphenylene polymethylene isocyanate | | | |
| 1 | 100 | 1.5 | 1.5 | 26 | 75 | 18 | 121 | 111 |
| 2 | 100 | 2 | 2 | 29 | 87 | 17 | 120 | 118 |
| 3 | 100 | 2 | 2 | 29 | 91 | 20 | 165 | 195 |
| 4 | 100 | 2 | 2 | 29 | 94 | 22 | 111 | 135 |
| 5 | 100 | 2 | 2 | 29 | 94 | 19 | 130 | 141 |
| 6 | 100 | 2 | 2 | 29 | 98 | 19 | 90 | 84 |
| 7 | 100 | 2 | 2 | 29 | 96 | 16 | 60 | 60 |
| 8 | 300 | 6.0 | 4.8 | 89 | 240 | 23 | 200 | 215 |

TABLE II.—PHYSICAL DATA FOR FOAMS

| Example No. | Density, lbs./cu. ft. | Compressive strength, lbs./sq. in. | | Flame test [1] | Torch test [2], min. |
|---|---|---|---|---|---|
| | | Parallel | Perpendicular | | |
| 1 | 2.19 | 40.1 | 16.4 | 10 NB 1.0 | [3] 30.00 |
| 2 | 2.09 | 38.1 | 18.9 | 10 NB | [3] 24.34 |
| 3 | 2.00 | 32.7 | 19.9 | 10 NB | [3] 14.56 |
| 4 | 2.01 | 36.1 | 13.5 | 10 NB | [3] 50.51 |
| 5 | 2.10 | 35.6 | 12.9 | 10 NB | [3] 33.07 |
| 6 | 2.10 | 33.3 | 14.1 | 10 NB | [3] 22.35 |
| 7 | 2.07 | 34.6 | 15.5 | 10 NB | [3] 17.36 |
| 8 | 2.33 | 37.2 | 15.8 | 10 NB | [3] 116.00 |

[1] NB means "non-burning" as determined by ASTM D-1692-59 T. The number preceding NB is the number of samples that did not burn; the number following NB is the average extent in inches of burning before self-extinguishing. If this number is 1.0 or less, the sample is "non-burning."
[2] SPI (Society of the Plastics Industry) Proposed Tentative Test Method for Flame Penetration Test, Draft 2. Briefly, specimens of foam are cut to a prescribed size, mounted in a Transiste holder with a backing of very rapid filter paper, and subjected to direct contact with a propane flame of specified length and having a temperature between 1910° to 1960° F. The average time for the filter paper to become ignited is reported as the measure of flame resistance of the foam.
[3] Average for 2 samples.

EXAMPLE 9

Boron trifluoride etherate (2.5 cc.) and ethylene glycol (one mole 62 parts) were charged to a reactor containing 198 parts (one mole) of dextrose (d-glucose monohydrate). Heat was applied and the temperature of the mixture increased to 70° C. Crude 4,4,4-trichloro-1,2-epoxybutane (940 parts) was added to the reaction mixture while maintaining a temperature of 70° C. A polyol having a hydroxyl number of 360 mg. KOH/gm. was obtained.

A conventional, low-pressure 4-stream foam machine capable of pouring foam formulations was provided with the ingredients listed below and the feed rate adjusted to provide a foam formulation in the following proportions:

Ingredients: Parts by weight
Polyether polyol _____ 100
Trichloromonofluoromethane _____ 30
Silicone surfactant as used in Example 1 ____ 2.0
Tetramethylbutanediamine _____ 1.5
Polyphenylene polymethylene isocyanate (105 Index) _____ 88.3

The reaction mixture was dispensed from the foaming machine into a square box having side dimensions of 8' x 2' and a height of 1½' and allowed to rise and cure to provide a rigid polyurethane foam. A cream time of 14 seconds, a rise time of 129 seconds, and a tack-free time of 95 seconds were observed.

A sample of the polyurethane foam was tested for fire hazard classification according to Underwriter's Laboratories, Inc. Test UL723, 3rd edition. The foam gave a maximum flame spread of 9½ feet, resulting in a rating of 25.

EXAMPLE 10

The procedure of Example 9 was followed to provide a polyether polyol which was then reacted exactly as described in Example 9 to provide a polyurethane foam with the exception that methylene-bis-(4-phenyl isocyanate) having an equivalent weight of 134 was employed instead of polyphenylene polymethylene isocyanate. The foaming conditions were as follows: cream time—17 seconds, rise time—124 seconds, and tack-free time—92 seconds. When tested for fire hazard classification as described in Example 9, the polyurethane foam had a maximum flame spread of 9½ feet, corresponding to a rating of 25.

EXAMPLE 11

To a mixture of 62 grams of ethylene glycol and 3 milliliters of boron trifluoride etherate, there were added 198 grams of dextrose (d-glucose monohydrate). The mixture was heated with stirring to 85° C. and then the addition of crude 4,4,4-trichloro-1,2-epoxybutane was commenced. A total of 858 grams of the epoxybutane was added over a period of 4 hours while maintaining a reaction temperature of 85–90° C. After a post-reaction time of 1.5 hours, the reaction product was neutralized with dilute caustic and then the volatiles were stripped off at 75° C. and 5 mm. of mercury pressure. The resulting polyether had a hydroxyl number of 377 and a chlorine content of 46.3% by weight.

A rigid polyurethane foam was prepared following substantially the procedure of Example 1 after substituting the polyether product of this example for that of Example 1.

The physical properties of the resulting foam are outlined in Table III below.

EXAMPLE 12

To a mixture of 62 grams of ethylene glycol, 3 milliliters of boron trifluoride etherate, and 18 grams of water, there were added 198 grams of dextrose (d-glucose monohydrate). The mixture was reacted with 858 grams of crude 4,4,4-trichloro-1,2-epoxybutane at a temperature of 85–90° C. The product polyether, upon being neutralized and stripped of volatiles, had a hydroxyl number of 377 and a chlorine content of 46.3% by weight. It was used to prepare a rigid polyurethane foam substantially as described in Example 1 after substituting the polyether of this example for that of Example 1. The physical properties of the resulting foam are outlined in Table III below.

TABLE III.—PHYSICAL DATA FOR FOAMS

| Example No. | Foam density, lbs./cu ft. | Compressive strength, lbs./sq. in. | | Flame test [1] | Torch test,[2] min. |
|---|---|---|---|---|---|
| | | Parallel | Perpendicular | | |
| 11 | 1.94 | 29.4 | 15.8 | 10 NB | 23 |
| 12 | 1.97 | 32.7 | 15.4 | 10 NB | 36 |

[1] As described in Table II above.
[2] As described in Table II above (average for 2 samples).

EXAMPLE 13

A mixture of 396 grams of dextrose (d-glucose monohydrate), 124 grams of ethylene glycol and 6 milliliters of boron trifluoride etherate was reacted first with 352 grams of ethylene oxide followed by 1630 grams of crude 4,4,4-trichloro-1,2-epoxybutane. The reaction was carried out at 75–90° C., at the end of which the product was neutralized and stripped of volatiles. The resulting polyether had a hydroxyl number of 356 and it contained 40% by weight chlorine. It was used to prepare a rigid polyurethane foam substantially as described in Example 1 after substituting the polyether of this example for that of Example 1. The resulting foam had the physical properties outlined in Table IV below.

EXAMPLE 14

A mixture of 180 grams of anhydrous dextrose, 62 grams of ethylene glycol and 2.5 milliliters of boron trifluoride etherate was reacted, at about 90° C., with 88 grams of propylene oxide followed by reaction with 795 grams of crude 4,4,4-trichloro-1,2-epoxybutane. The product polyether, upon being neutralized and stripped of volatiles, had a hydroxyl number of 355 and 42.5% by weight of chlorine. It was used to prepare a rigid polyurethane foam substantially as described in Example 1 after substituting the polyether of this example for that of Example 1. The physical properties of the resulting foam are outlined in Table IV below.

EXAMPLE 15

A mixture of 198 grams of dextrose (d-glucose monohydrate), 32 milliliters of water, and 1.0 milliliter of boron trifluoride etherate was reacted with 55 grams of ethylene oxide at 65° C. The water was then stripped off and two additional milliliters of boron trifluoride etherate and 688 grams of crude 4,4,4-trichloro-1,2-epoxybutane were added. The mixture was allowed to react for several hours at 75–85° C. The product polyether, which was neutralized and stripped of volatiles, had a hydroxyl number of 271 and a chlorine content of 46.5% by weight. It was used to prepare a polyurethane foam substantially as described in Example 1 after substituting the polyether of this example for that of Example 1. The physical properties of the resulting foam are outlined in Table IV below.

EXAMPLE 16

Ethylene oxide (55 grams) was reacted with a mixture of 198 grams of dextrose (d-glucose monohydrate), 32 milliliters of water and 1.0 milliliter of boron trifluoride etherate. Sixty-two grams of ethylene glycol were blended into the mixture which was then stripped of water. This mixture was next reacted with 773 grams of crude 4,4,4-trichloro-1,2-epoxybutane at a temperature of about 75–80° C. and in the presence of an additional two milliliters of boron trifluoride etherate. The product polyether, upon being neutralized and stripped of volatiles had a hydroxyl number of 335 and 44.2% by weight of chlorine. It was used to prepare a rigid polyurethane foam substantially as described in Example 1 after substituting the polyether of this example for that of Example 1. The physical properties of the resulting foam are outlined in Table IV below.

EXAMPLE 17

Following the procedure of the preceding examples, a polyether was prepared by reacting 1010 grams of crude 4,4,4-trichloro-1,2-epoxybutane with a mixture of one mole of anhydrous dextrose and one mole of glycerol. The polyether thus prepared had a hydroxyl number of 343 and contained 47.5% by weight of chlorine. It was employed in the preparation of a rigid polyurethane foam according to the procedure of Example 1 after substituting the polyether of this example for that of Example 1. The physical properties of the resulting foam are outlined in Table IV below.

EXAMPLE 18

A mixture of one mole of anhydrous dextrose, one mole of glycerol and two milliliters of boron trifluoride etherate was reacted with 1.7 moles of propylene oxide. Following the procedure of the preceding examples, the product was then reacted with 794 grams of crude 4,4,4-trichloro-1,2-epoxybutane to obtain a polyether having a hydroxyl number of 340 and 42.5% by weight of chlorine.

The product polyether was used to prepare a rigid polyurethane foam substantially as described in Example 1 after substituting the polyether of this example for that of Example 1. The physical properties of the foam are provided in Table IV below.

TABLE IV.—PHYSICAL DATA FOR FOAMS

| Example No. | Foam density, lbs./cu. ft | Compressive strength, lbs./sq. in. | | Flame test [1] | Flame spread rating [2] |
|---|---|---|---|---|---|
| | | Parallel | Perpendicular | | |
| 13 | 2.02 | 36.3 | 20.2 | 10 NB | 21 |
| 14 | 2.07 | 44.2 | 19.8 | 10 NB | 45 |
| 15 | 2.02 | 37.8 | 15.6 | 10 NB | 44 |
| 16 | 1.97 | 37.8 | 15.0 | 10 NB | 46 |
| 17 | 1.97 | 42.3 | 16.9 | 10 NB | 40 |
| 18 | 1.92 | 40.4 | 14.9 | 10 NB | 42 |

[1] As described in Table II above.
[2] According to Underwriter's Laboratories, Inc., Test UL723, 3rd Edition.

What is claimed is:

1. A polyurethane foam prepared by a process which comprises reacting together in the presence of a catalyst
   (a) a chlorinated polyhydroxy polyether prepared by reacting, at a temperature of about 30–200° C. and in the presence of an acid catalyst, (1) a sucrose- or dextrose-based material with (2) a proportion of at least 15% by weight, based on the total weight of reactants employed in preparing said polyether, of 4,4,4-trichloro-1,2-epoxybutane,
   (b) an organic isocyanate in an amount sufficient to provide at least 0.7 NCO group per hydroxyl group which is present, and
   (c) a foaming agent.

2. The polyurethane foam of claim 1 wherein a dextrose-based material is employed in the preparation of said polyether.

3. The polyurethane foam of claim 2 wherein the proportion of said 4,4,4-trichloro-1,2-epoxybutane ranges from about 30% to about 85% by weight based on the total weight of reactants employed in preparing said polyether.

4. The polyurethane foam of claim 3 wherein said polyether has a hydroxyl number ranging from about 250 to about 550.

5. The polyurethane foam of claim 4 wherein said dextrose-based material is selected from the group consisting of a mixture of dextrose and a polyhydric alcohol, a mixture of dextrose, water and a polyhydric alcohol, an oxyalkylated mixture of dextrose and a polyhydric alcohol, and an oxyalkylated mixture of dextrose and water.

6. The polyurethane foam of claim 5 wherein said dextrose-based material is a mixture of dextrose and a polyhydric alcohol.

7. The polyurethane foam of claim 6 wherein said acid catalyst is boron trifluoride etherate.

8. The polyurethane foam of claim 7 wherein said polyhydric alcohol is ethylene glycol.

9. The polyurethane foam of claim 8 wherein said polyether contains from about 25% to about 50% by weight of chlorine.

10. The polyurethane foam of claim 9 wherein said organic isocyanate is polyphenylene isocyanate.

References Cited
UNITED STATES PATENTS

| | | |
|---|---|---|
| 3,167,538 | 1/1965 | Kaiser. |
| 3,269,961 | 8/1966 | Bruson et al. |
| 3,630,973 | 12/1971 | Ardis et al. _____ 260—2.5 |
| 3,399,217 | 8/1968 | Zaslomsky _____ 260—348.6 |

DONALD E. CZAJA, Primary Examiner

H. S. COCKERAM, Assistant Examiner

U.S. Cl. X.R.

260—2.5 AJ, DIG. 24

UNITED STATES PATENT OFFICE
CERTIFICATE OF CORRECTION

Patent No. 3,741,921          Dated June 26, 1973

Inventor(s) Milton Lapkin

It is certified that error appears in the above-identified patent and that said Letters Patent are hereby corrected as shown below:

Column 2, line 11, "and" should read ---an---.

Column 2, line 16, after "mixture" insert ---of---.

Column 6, line 46, "was" should read ---were---.

Column 7, in Table 2, line 41, "30.00" should read ---30:00---.

Column 7, in Table 2, line 42, "24.34" should read ---24:34---.

Column 7, in Table 2, line 43, "14.56" should read ---14:56---.

Column 7, in Table 2, line 44, "50.51" should read ---50:51---.

Column 7, in Table 2, line 45, "33.07" should read ---33:07---.

Column 7, in Table 2, line 46, "22.35" should read ---22:35---.

Column 7, in Table 2, line 47, "17.36" should read ---17:36---.

Column 7, in Table 2, line 48, "116.00" should read ---116:00---.

Column 11, in the claims, Claim 10, after "polyphenylene" insert ---polymethylene---.

Signed and sealed this 1st day of January 1974.

(SEAL)
Attest:

EDWARD M. FLETCHER, JR.          RENE D. TEGTMEYER
Attesting Officer                Acting Commissioner of Patents